United States Patent Office 2,802,633
Patented Aug. 13, 1957

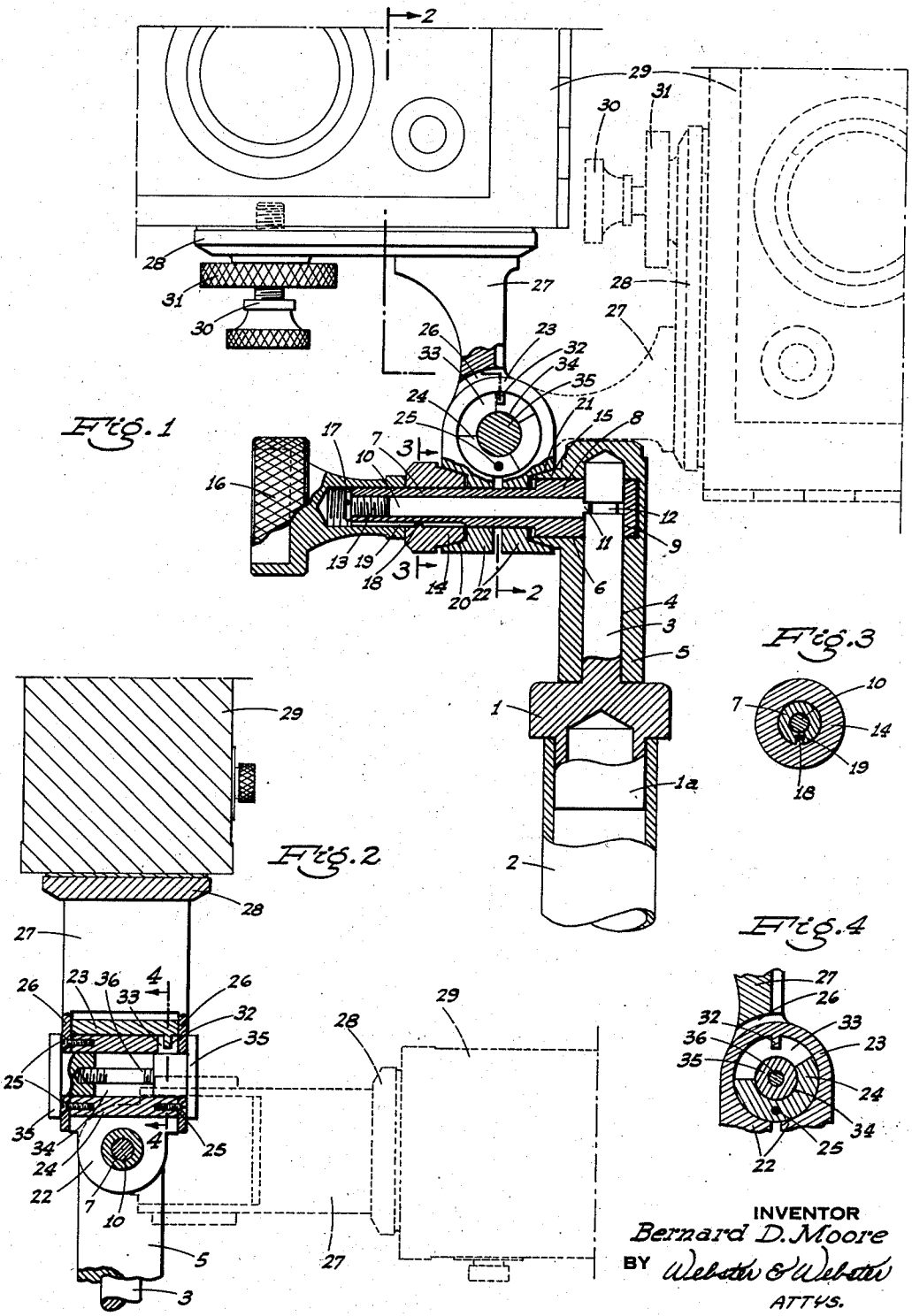

2,802,633

UNIVERSAL HEAD FOR A CAMERA TRIPOD

Bernard D. Moore, Chico, Calif.

Application July 25, 1955, Serial No. 524,216

5 Claims. (Cl. 248—179)

The present invention relates in general to an improved head for attaching a camera on a tripod.

In particular the invention is directed to, and it is a major object to provide, a head—for mounting a camera on a tripod—which is adapted for ready and convenient universal adjustment, whereby to dispose the camera at any desired angle or position for use; the head permitting of selective and independent swinging adjustment of the camera in a horizontal plane and in vertical planes at right angles to each other.

Another object of the invention is to provide a universal head, for mounting a camera on a tripod, wherein the parts are locked up to maintain the camera in a set position for use, or released for adjustment of the camera to a different position, by means of a single finger knob.

It is also an object of the invention to provide a universal head, for mounting a camera on a tripod, which is designed for ease and economy of manufacture; the head in its structural arrangement being quite compact.

Still another object of the invention is to provide a practical, reliable, and durable universal head, for mounting a camera on a tripod, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, mainly in section, showing the universal head for a camera tripod.

Fig. 2 is a fragmentary transverse sectional elevation taken on line 2—2 of Fig. 1.

Fig. 3 is a transverse section taken on line 3—3 of Fig. 1.

Fig. 4 is a fragmentary transverse section taken on line 4—4 of Fig. 2.

Referring now more particularly to the drawings, and to the characters of reference marked thereon, the universal head, for mounting a camera on a tripod, comprises an enlarged circular cap 1 adapted to rest on the upper open end of a tubular post 2 included in the tripod at the top thereof; the tripod not being otherwise shown, but which is of conventional form. The cap 1 includes a depending cylindrical boss 1a which frictionally but removably seats in the upper end portion of said post 2.

The enlarged circular cap 1 is formed, centrally thereof, with an integral, upwardly projecting or vertical spindle 3, which spindle extends into the bore 4 of a vertical stem 5 which surrounds said spindle from end to end thereof. The bore 4 terminates adjacent but short of the upper end of the stem 5, while the lower end of the latter rests against the cap 1. With such arrangement the stem 5 is capable of turning about the spindle 3 as an axis, but these parts are normally but releasably locked against such rotation in the manner as will hereinafter appear.

In the upper end portion thereof, but short of the corresponding end of the bore 4, the vertical stem 5 is formed with a horizontal, laterally opening bore 6 which intersects said bore 4.

A laterally extending spindle 7 projects from the vertical stem 5, and said spindle includes an enlarged inner end head 8 which is received in matching relation in the bore 6; said enlarged inner end head 8 of the spindle 7 having a vertical bore 9 therein through which the related portion of the spindle 3 passes in relatively rotatable relation. The spindle 7 is thus held against rotation relative to spindle 3 and stem 5, while being axially movable relative to said stem.

The vertical stem 5 and the laterally projecting spindle 7 are maintained against upward displacement relative to the vertical spindle 3 by means of the following arrangement:

The laterally projecting spindle 7 is tubular, and a pin 10 is engaged therein; the inner end of said pin 10 being formed with an inwardly projecting tongue 11 which extends into a circumferential groove 12 in the spindle 3. The pin 10 is maintained in position in the spindle 7, with the tongue 11 in groove 12, by means of a retention screw 13 threaded into the outer end of said spindle 7 and bearing against the adjacent end of such pin 10.

Tapered plugs 14 and 15, which extend toward each other, surround the laterally projecting spindle 7 intermediate its ends and in spaced relation axially thereof; the tapered plug 14 being slidable on said spindle 7, while the tapered plug 15 is formed integral with the vertical stem 5 and surrounds the outermost part of the enlarged inner end portion 8 of said spindle 7.

A finger nut 16 is disposed axially outwardly of the free end of the laterally projecting spindle 7, and includes an elongated shank 17 adjustably threaded onto said spindle 7; the free end of the shank 17 bearing against the adjacent end of the tapered plug 14. While said tapered plug 14 is slidable on the laterally projecting spindle 7, being urged inwardly by the shank 17 when the finger nut 16 is tightened, undesirable rotation of such tapered plug 14 is prevented by means of an integral, radially inwardly projecting key 18 thereon which engages in a longitudinal keyway 19 cut in said spindle 7.

The tapered plugs 14 and 15 are received in matching relation in outwardly opening tapered seats 20 and 21 formed in clamping ears 22 through which the laterally projecting spindle 7 extends in relatively slidable relation; said tapered seats 20 and 21 being concentric to the axis of said spindle 7.

The clamping ears 22 are included as parts of a split clamping collar 23 disposed radially out from, and normally above, the laterally projecting spindle 7; the axis of said split clamping collar 23 being disposed at a right angle to the axis of said spindle 7.

The split clamping collar 23 surrounds a relatively large-diameter hub 24, which hub is in turn secured by screws 25 between transversely spaced face plates or ears 26 formed on the inner end of a normally upwardly projecting bracket 27. At its outer end the bracket 27 is fixed to one end portion of a flat attachment base plate 28, and on which plate a camera 29 is adapted to be secured by a finger screw 30 normally held against loosening by a finger knob 31 on said screw.

In order to limit the extent to which the bracket 27 can swing about the hub 24, the clamping collar 23 is formed with an internal or radially inwardly projecting stop dog 32 which runs in a part-circle groove 33 in the hub 24. The purpose of this stop arrangement is to prevent the bracket 27, when the camera is swung from its full-line position to its dotted-line position of Fig. 1, from striking the upper end of the vertical stem 5, and which could conceivably result in breakage of the bracket 27. Similarly, the stop arrangement limits the extent to which the camera 29 and bracket 27 may swing in the opposite direction.

A bore 34 extends axially through the face plates 26 and hub 24; such bore being closed at its ends by shouldered flat-headed cap nuts 35 connected together within the hub 24 by a double-ended center screw 36. Such cap nuts not only close the ends of the bore 34, but on the outside cover the screws 25 so that they do not present an unsightly appearance.

When the described universal head is in use, with the camera 29 set in a selected position, the finger nut 16 is tightened, which results in the tapered plugs 14 and 15 being drawn tightly into the tapered seats 20 and 21, whereby the clamping ears 22 contract the split clamping collar 23 and lock it to the hub 24. This prevents the hub 24 from turning in the collar 23, and additionally holds the clamping ears 22 against turning about the laterally projecting spindle 7.

Also, when the finger nut 16 is tight, with the tapered plugs 14 and 15 drawn positively into the tapered seats 20 and 21 of the clamping ears 22, a tension in an axially outward direction is imposed on said spindle 7, and such tension effectively binds the vertical spindle 3 and stem 5 against relative rotation.

As a result, the finger nut 16 locks up all of the otherwise adjustable parts of the described head.

When it is desired to adjust the angle or position of the camera 29, the camera operator slightly loosens the finger nut 16 so that the tapered plugs 14 and 15 may relatively separate very slightly, which not only releases the clamping ears 22 but relieves the tension on spindle 7. Thereafter, the operator—with the camera 29 gripped in one hand—can effect universal adjustment thereof. More specifically, the camera 29, when the finger nut 16 is loosened, can be swung in a horizontal plane about the spindle 3 with the stem 5 rotating thereon; or said camera may be swung about the laterally projecting spindle 7 with the clamping ears 22 turning on said spindle; or the camera may be swung with the hub 24 turning in the clamping collar 23.

It will thus be recognized that the camera can be readily swingably adjusted selectively and independently in a horizontal plane, and in vertical planes at right angles to each other, all whereby universal adjusting or setting of the camera to a desired position of use can be accomplished.

After each adjustment of the camera the operator merely tightens the single finger nut 16 to lock up all the parts of the head, as hereinbefore described.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A head for mounting a camera on a tripod comprising a vertical non-turnable tripod-supported spindle, a stem turnable on the spindle, a horizontal non-rotatable spindle projecting laterally from the stem and axially movable relative thereto, an enlarged head on the inner end of the lateral spindle embracing the adjacent portion of the vertical spindle in relatively turnable relation about the axis of said vertical spindle, a base plate on which to mount a camera, a cylindrical hub secured to the base plate and extending transversely of the lateral spindle intermediate the ends thereof in offset relation thereto, a clamping collar about the hub and including means mounting the same on the lateral spindle for rotation about the axis thereof, a movable hand actuated element mounted on the outer end of the lateral spindle, and means between said element, the collar and the vertical spindle arranged upon movement of the element in one direction to clamp the collar about the hub, prevent rotation of said collar about the lateral spindle, and at the same time clamp the vertical spindle to the stem.

2. A head for mounting a camera on a tripod comprising a vertical non-turnable tripod-supported spindle, a stem turnable on the spindle, a horizontal non-rotatable spindle projecting laterally from the stem and axially movable relative thereto, an enlarged head on the inner end of the lateral spindle embracing the adjacent portion of the vertical spindle in relatively turnable relation about the axis of said vertical spindle, a base plate on which to mount a camera, a cylindrical hub secured to the base plate and extending transversely of the lateral spindle intermediate the ends thereof in offset relation thereto, a clamping collar about the hub split radially at right angles to the lateral spindle, ears depending from the collar on opposite sides of the split and embracing the lateral spindle in turnable relation, a hand knob threaded onto the outer end of the lateral spindle, and means between the knob, ears, and vertical spindle arranged upon rotation of the knob in one direction and movement of the same along said spindle to clamp the collar about the hub, prevent rotation of said ears relative to the lateral spindle, and at the same time clamp the vertical spindle to the stem.

3. A device, as in claim 2, in which said means comprises elements on said lateral spindle in normal friction engagement with the ears, one element being between the knob and the adjacent ear and being slidable on said spindle, and the other element being stationary relative to said spindle.

4. A device, as in claim 3, with means to hold said one element against rotation on the lateral spindle.

5. A device, as in claim 2, in which said elements comprise plugs, said other one of which is rigid with the vertical stem; the opposed faces of the ears being formed with tapered seats and the outer surface of the plugs being correspondingly tapered to engage in the seats.

References Cited in the file of this patent

UNITED STATES PATENTS

| | | |
|---|---|---|
| 2,524,473 | Pasturczak | Oct. 3, 1950 |
| 2,556,598 | Rasine | June 12, 1951 |